C. W. MORDEN.
CLUTCH AND BRAKE CONTROL FOR POWER TRANSMITTING MECHANISM.
APPLICATION FILED NOV. 13, 1912.
1,119,364.
Patented Dec. 1, 1914.
5 SHEETS—SHEET 4.
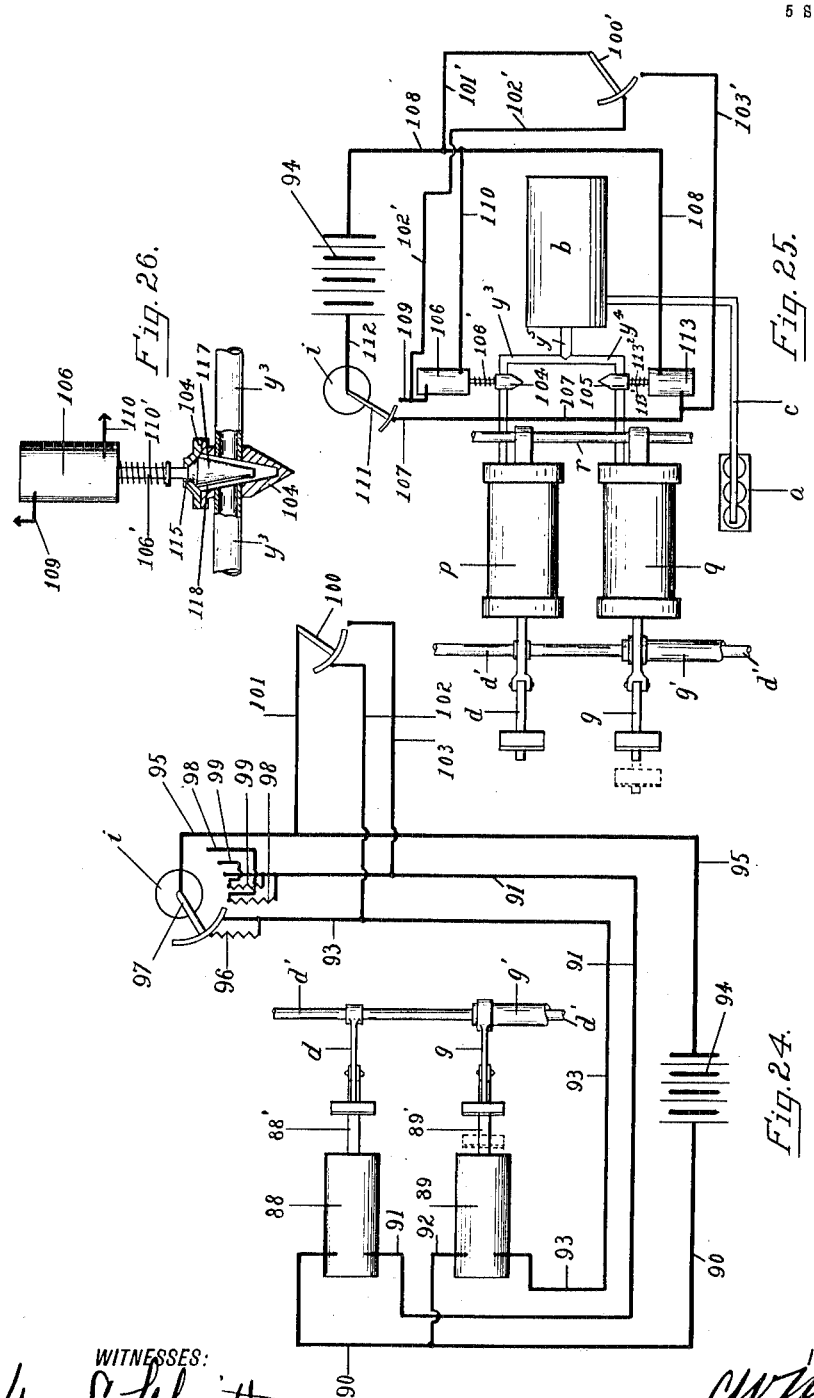

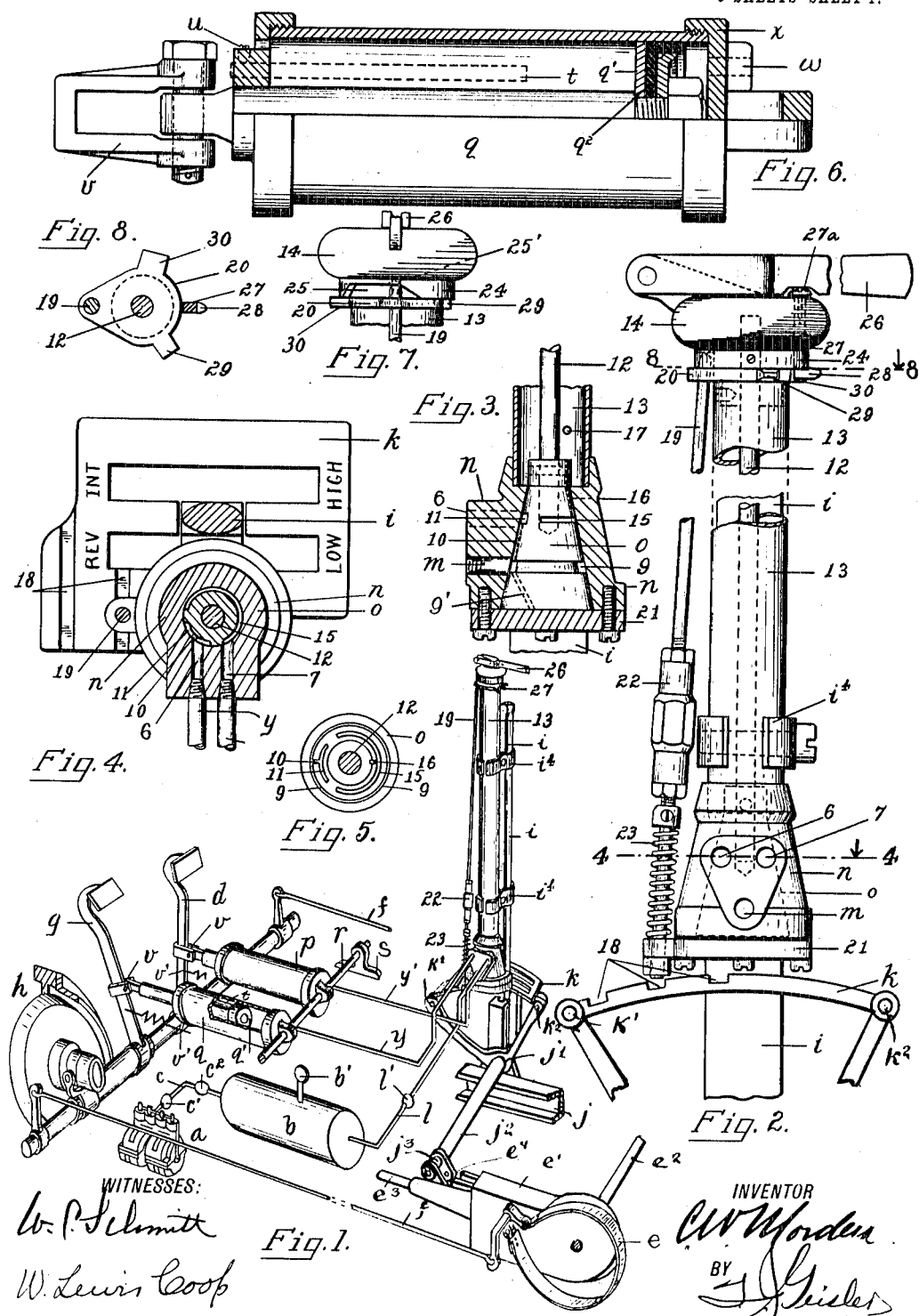

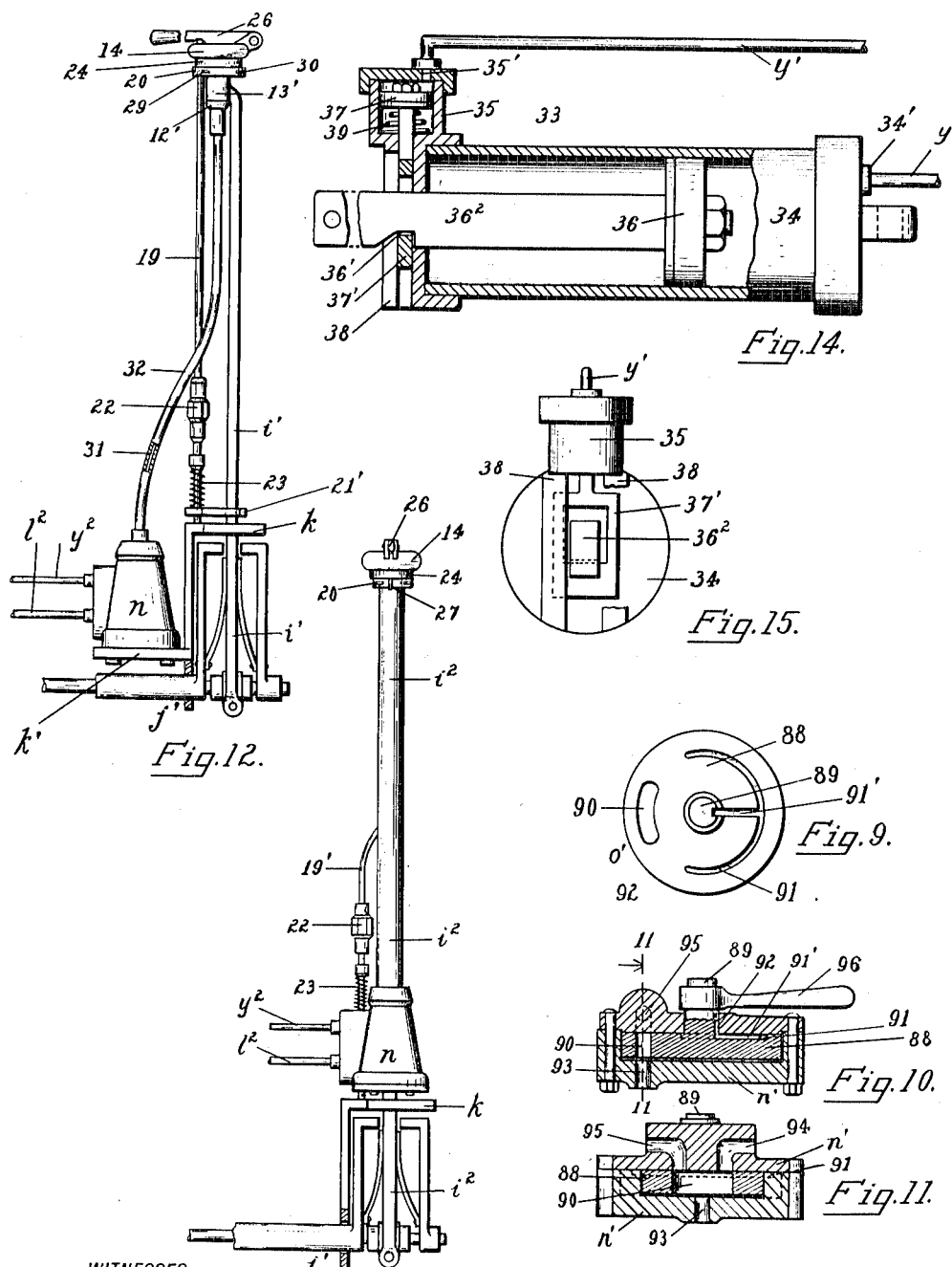

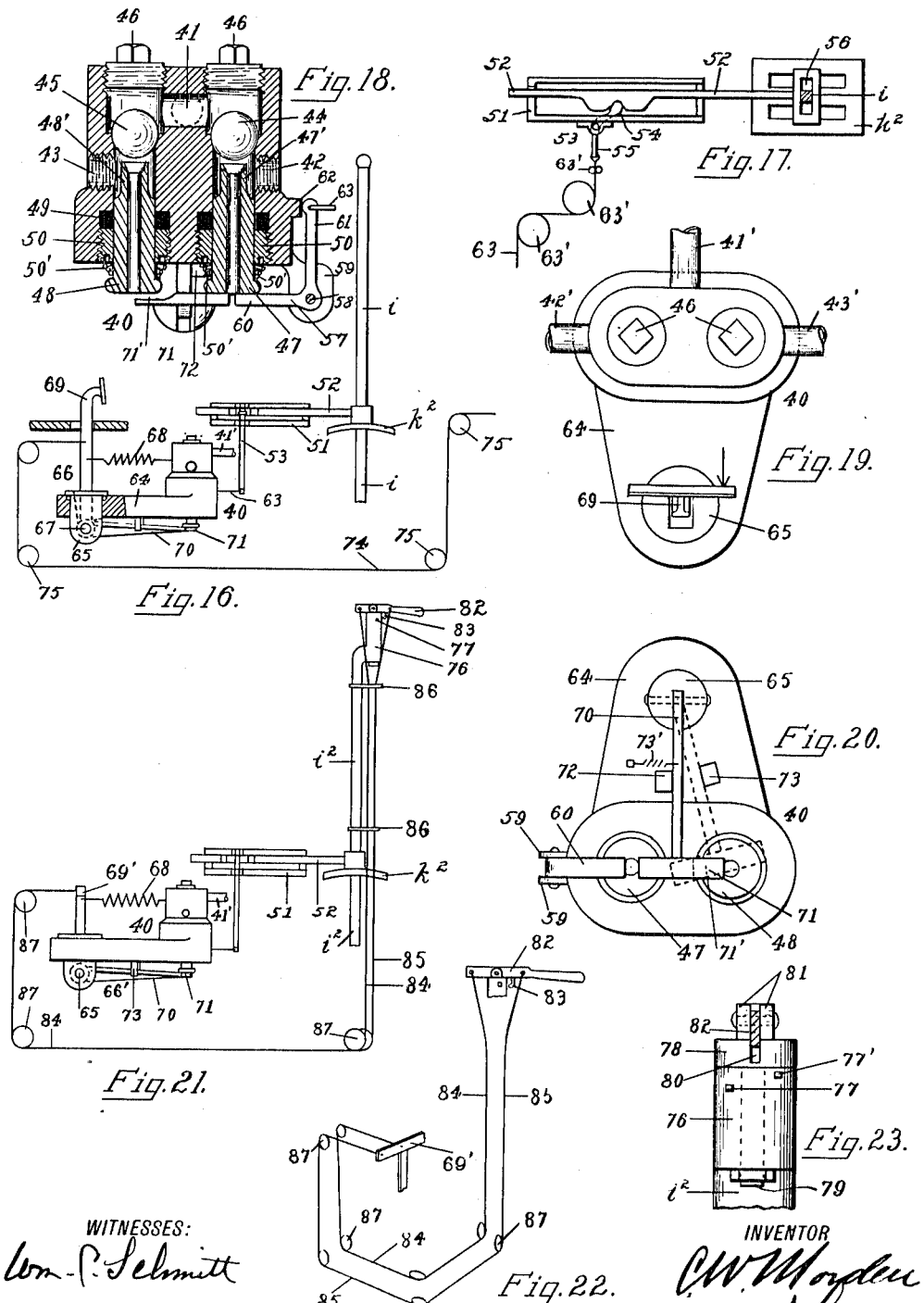

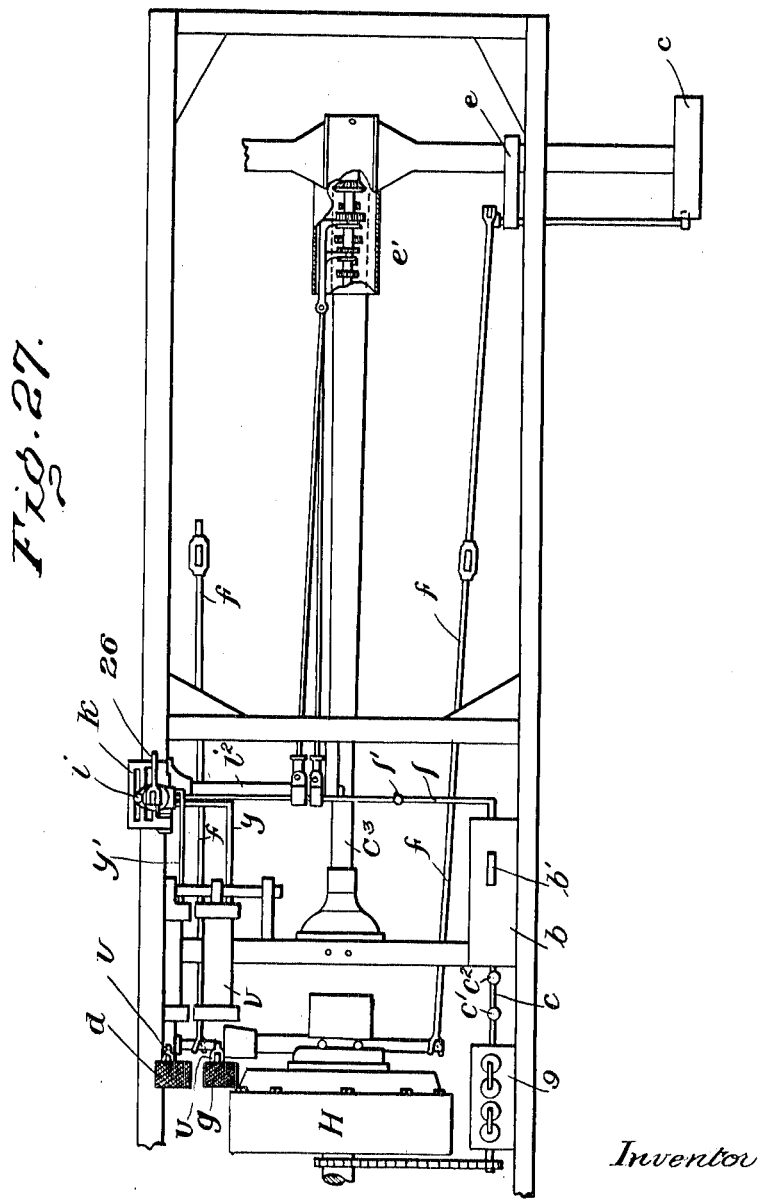

UNITED STATES PATENT OFFICE.

CHARLES W. MORDEN, OF PORTLAND, OREGON.

CLUTCH AND BRAKE CONTROL FOR POWER-TRANSMITTING MECHANISM.

1,119,364.   Specification of Letters Patent.   Patented Dec. 1, 1914.

Application filed November 13, 1912. Serial No. 731,189.

*To all whom it may concern:*

Be it known that I, CHARLES W. MORDEN, a citizen of the United States, and a resident of Portland, county of Multnomah, and State of Oregon, have invented a new and useful Improvement in Clutch and Brake Control for Power-Transmitting Mechanism, of which the following is a specification.

My invention relates in general to any power transmitting mechanism including both a variable-speed drive and a brake, or only the former, and relates specifically to the power transmitting mechanism and brake of motor propelled vehicles or automobiles.

For the sake of clearness my invention will be described with reference to its use on an automobile.

In this connection the primary object of my invention is: the providing of means for the better, simpler and more convenient operation of the mechanism whereby the car is propelled and its speed is controlled. To this end my invention provides means for operating the clutch and the brake by some convenient agent—such, for example, as compressed air or electricity, or a combination of compressed air and electricity—controlled by means brought to the gear-shift lever, and preferably operated in conjunction with the latter, instead of by independent devices—the pedals now provided for the clutch and the brake—which require independent, intelligent control at points distant from the gear-shift lever.

Further objects of my invention are: providing means for guiding the driver of the car in the operation of the clutch and the brake; this object being attained by providing stops, or equivalent means, located at predetermined points, contact with which will indicate the present state or the action which will follow, thus incidentally rendering the driving of the automobile more simple and less fatiguing due to the non-necessity of manually operating the clutch and brake pedals; providing supplemental means, operable from a point within reach of the passenger in the body of the car, whereby the clutch may be thrown out and the brake simultaneously applied in case of an emergency; providing for the automatic disengagement and subsequent reëngagement of the clutch coincidentally with the operation of the gear-shift lever in the act of changing the speed, thus preventing injury to the power transmitting mechanism by an inexperienced or careless driver; or means whereby the gear-shift lever is locked in place against being operated to change the speed until the clutch has previously been disengaged. Finally, my purpose is to use for accomplishing said results means that are capable of being conveniently applied as an attachment to built automobiles as well as built into the speed controlling mechanism of new automobiles or other motor propelled vehicles, and, in either case, to use means which will not interfere with the control of the car in the usual manner by the devices now employed.

The construction and operation of the devices employed by me are illustrated in the accompanying drawings, in which:

Figure 1 is a diagrammatic perspective view illustrating the application of my invention as an attachment, connecting the gear-shift lever with the automatic clutch and brake mechanism, said automatic devices being shown as operated to disengage the clutch; Fig. 2 is a fragmental side elevation, on a larger scale, detailing the operating column and controller valve which are attached to the regular form of gear-shift lever when my invention is used as an attachment, as shown in Fig. 1; this figure further illustrates the provision of means whereby the gear-shift lever is locked against movement to change the speed until the controlling valve of said automatic mechanisms has been set to cause the disengagement of the clutch; Fig. 3 is a partial sectional elevation of the controller valve element of said automatic clutch and brake mechanisms; Fig. 4 is a horizontal section taken approximately on the line 4—4 of Fig. 2; Fig. 5 is a diagrammatic plan or top view of the valve plug of the valve element, showing the relative arrangement of its ducts; Fig. 6 is a side elevation, shown partly in section, of the form of cylinder and piston employed in the pneumatic means for operating the clutch and brake mechanisms; Fig. 7 is a fragmental detail of the means by which the gear-shift lever is locked against movement to change the speed until the clutch has been released; Fig. 8 is a horizontal sectional detail taken on the line 8—8 of Fig. 2; this view illustrates the provision of stops which serve as guides for the proper positioning of the controller valve of the automatic clutch and brake operating mechanisms; Fig. 9 is a plan view of a modified form of controller valve which may be used in place of the form shown in the preceding figures; Fig. 10 is a longitudinal vertical sectional detail of the modified controller valve element of said automatic clutch and brake mechanism; Fig. 11 is a vertical section taken approximately on the line 11—11 of Fig. 10; this view shows the arrangement of the ports which connect with the automatic clutch and brake mechanism actuating devices and with the storage tank; Fig. 12 is a rear elevation illustrating that the controller valve element of the auxiliary clutch and brake mechanism may be located at any point with respect to the gear shifting devices, while the means for operating said controller may be incorporated in the gear-shift lever; Fig. 13 is a rear elevation illustrating that the controller valve element of the auxiliary clutch and brake mechanism may be bodily incorporated in the gear-shift lever, instead of being embodied in an attachment thereto; Fig. 14 is a detailed elevation, shown partly in section, of a single compound pneumatic cylinder through which both the clutch and brake mechanisms are actuated; this figure further illustrates the auxiliary means for controlling the actuating of the brake mechanism alone; Fig. 15 is an end elevation of the cylinder detailed in Fig. 14, certain parts having been broken away so as to show more clearly the construction of certain other parts; Fig. 16 is a side elevation illustrating that the means for operating the clutch mechanism may be arranged to be actuated by a movement of the gear-shift lever; this figure further illustrates the manner in which the controller valve element may be operated from some other point or points independent of the gear-shift lever; Fig. 17 is a detailed plan view of the means which, by a movement of the gear-shift lever, will automatically act to disengage the clutch, and cause same to be reëngaged when the gear-shifting has been completed; Fig. 18 is a detailed sectional elevation of a form of controller valve element to be used when said element is controlled by the movement of the gear-shift lever or from the gear-shift lever and from some other point or points; Fig. 19 is a plan view of the controller valve element and its adjacent parts; Fig. 20 is a bottom plan view of the parts shown in Fig. 19; the broken lines of this figure indicate the position assumed by the valve operating means when the brake mechanism alone is to be actuated; Fig. 21 is a side elevation illustrating a means by which the controller valve element may be operated wholly by and from the gear-shift lever; Fig. 22 is a diagrammatic perspective view of the transmission means by which a movement of a device embodied in the gear-shift lever will be transmitted to the controller valve element, thereby operating the latter; Fig. 23 is a detailed rear elevation of the upper portion of the gear-shift lever, showing more clearly the construction of same which will permit the operation of a handle for actuating the controller valve element; also further illustrating the means by which said handle may be held in either of its operative positions; Fig. 24 is a diagrammatic plan view of a construction of my device in which the clutch and brake mechanisms are actuated by the application of electrical energy; the controlling feature in this case consists of a switch incorporated in the gear-shift lever; this figure also shows means by which the clutch and brake mechanisms may be actuated by the operation of a switch located at some other point, as for instance in the tonneau of a car; Fig. 25 is a diagrammatic plan view of a contruction of my device in which the control system combines both the pneumatic and electric features; the pneumatic features in this case are very similar to those described in the preceding figures, the controller valves, however, being operated by the application of electrical energy instead of being manually operated; the controlling features in this case may be incorporated in the gear-shift lever, and auxiliary control devices may be located at some other point as in the tonneau of the car; and Fig. 26 is a detailed plan view, partly in section, of one of the controller valves and its adjacent parts, as shown in Fig. 25; in this view the valve is shown open, thereby admitting air to one of the pneumatic cylinders. Fig. 27 is a plan view of a portion of the chassis of an automobile, illustrating the application of my invention.

For convenience, I will describe my invention as an attachment for built automobiles, since that will also suggest the application of my invention in the building of new cars.

In the first instance herein described, I find it convenient to use, as the motive force, compressed air. The means providing this agent are represented in Fig. 1 by a pump $a$, which delivers compressed air to a storage tank, $b$, through pipe $c$. The storage tank has a pressure gage $b'$, and means are also required for controlling the pressure in the tank $b$ so as to be maintained at the degree suitable to the operation of the devices hereinafter described. Such means are represented in Fig. 1 by a check-valve located at $c^2$ and relief valve located at $c'$, for relieving the pump discharge to the atmosphere when a predetermined pressure has been reached in the storage tank $b$. In case it is desired to maintain a high pressure in the tank $b$, a reducing valve may be installed at some convenient point, as for example at $l'$ in the pipe $l$. These devices, however, are common and may be left to the judgment of the mechanic installing my improvement.

$d$ represents the pedal of an ordinary form of brake mechanism, of which the brake-strap, $e$, and connecting rod, $f$, are shown only in Fig. 1; and $g$ represents the pedal of an ordinary form of clutch element $h$. The gear-shift lever $i$ extends through the H-plate $k$, a better view of which is shown in Fig. 4, the latter being provided with the usual slots, arranged to throw the gear-shift lever into its various positions, namely: neutral (in which it is shown in Fig. 4), low, intermediate, high and reverse, as usual in adjusting the speed and direction of travel of the vehicle. The side frame member $j$ of the chassis has rigidly mounted on it a double-armed standard $j'$, the ends of these arms acting as a fixed support for the H plate $k$, as shown at $k'$ and $k^2$. The sleeve $j^2$ is rotatably journaled in the standard $j'$ and acts as a bearing for the shaft $j^3$. The gear shift lever $i$ is connected to the sleeve $j^2$ and shaft $j^3$ in the usual manner, as shown more clearly in Fig. 12. The transmission case is represented by $e'$, the rear axle of the vehicle by $e^2$, and the propeller shaft by $e^3$. The connections by which the speed changing gears contained in the transmission case are relatively moved by the operation of the gear shift lever, $i$, are shown diagrammatically at $e^4$ in Fig. 1.

From the storage tank, $b$, a pipe, $l$, conducts the compressed air to the port, $m$, of the valve chamber $n$, in which is a conical valve $o$. See Figs. 2 and 3. The adjustment of this valve controls the passage of the compressed air into the cylinders, $p$, $q$, in each of which operates a piston as $q'$, the rods of these pistons being connected with the clutch and brake pedals, $g$, $d$, respectively, as shown in Fig. 1. The cylinders $p$, $q$, are hinged at one end on a rod $r$, supported in brackets, as $s$, affixed on the frame of the vehicle. This arrangement is necessary to adapt the cylinders, $p$, $q$, to accommodate the movements of the brake and clutch pedals, $d$, $g$. The pistons are connected to the pedals by clevices $v$. The construction of the cylinders, $p$, $q$, their pistons and connections with the related parts, are identical, except that in the cylinder $q$—the piston of which operates the clutch pedal $g$—is provided an adjustable stop-pin $t$ (see Fig. 6), fixed in place after being adjusted as required by a set-screw $u$, so as to prevent further outward movement of the piston $p'$ than required to disengage the clutch members of the power transmitting devices. Each of the cylinders, $p$, $q$, is provided with a port $w$ (see Fig. 6) in the head, $x$, such ports being connected by flexible pipes, $y$, $y'$, with the ports 6 and 7 of the valve-chamber $n$.

When compressed air is admitted into the cylinder $q$, the consequent forward movement of its piston causes the pedal $g$ to be thrown forward, whereby the clutch is thrown out of engagement. The stop-pin $t$ in the cylinder $q$, as mentioned, prevents the movement of the piston beyond the point necessary to throw out the clutch. When compressed air is admitted into the cylinder $p$, the forward movement of the piston therein actuates the brake pedal, $d$, thus applying the brake.

The relation and operation of the valve, $o$, is diagrammatically illustrated in Fig. 5, taken in connection with Figs. 3 and 4. The valve-chamber $n$ is made with three ports, $m$, 6, 7. See Fig. 2. The port, $m$, is connected with the tank, $b$, by pipe $l$, the port, 6, with the cylinder, $q$, by pipe, $y$, and the port, 7, with the cylinder, $p$, by pipe $y'$. The valve, $o$, is made with a circumferential groove, 9, near the base, in the plane of the port $m$. An inclined duct $9'$ extends downwardly from the groove 9. In this way the air under pressure in this duct will tend to hold the valve up against its seat. From the groove 9 extends upward a duct 10 to a segmental circumferential groove 11, located in the plane of the ports 6 and 7. The groove 9, duct 10, and segmental groove, 11, are constantly in communication with the tank $b$. The valve, $o$, is further made with a segmental circumferential exhaust or relief groove 15, having an outlet duct, 16, into the casing 13, and the latter has an outlet orifice 17. The groove, 15, is so arranged as to provide for the escape of the compressed air in the cylinders behind the pistons when the latter are to be released. The valve, $o$, is provided with a rod 12 (see Figs. 2 and 3) inclosed in a tubular case 13. On the upper end of the valve rod 12 is fixed a knob 14. The tubular case, 13, is attached to the gear-shift lever, $i$, by clamps $i^4$.

In Fig. 4 the valve, $o$, is shown in its clutch operating position, being so positioned by giving the knob 14 approximately an eighth turn counter-clockwise from its neutral position, thus bringing the segmental groove, 11, into registration with the port 6, and opening a passage for the compressed air through pipe, $y$, into the clutch cylinder $q$. By giving the valve, $o$, an approximate one-fourth turn counter-clockwise from its neutral position the segmental groove, 11, is made to register with both ports 6 and 7, thus opening a passage for compressed air through pipes $y$ and $y'$ into the clutch and the brake cylinders, $p$, $q$, simultaneously. By giving the valve, $o$, an approximate three-eighths rotation, counter-clockwise from its neutral position, the segmental groove, 11, will be made to register only with the port 7 thus opening a passage for the compressed air through the pipe $y'$ leading to the brake cylinder. The return movement of the pistons in the cylinders, $p$, $q$, is accomplished by the springs provided for returning the pedals in automobiles; and, if required, auxiliary springs may be provided arranged as indicated at $v'$ in Fig. 1.

Since, as mentioned, my devices are designed to permit the operation of the clutch and the brake as usual, by the pedals, as well as by my attachment, I avoid any resistance by the pistons to their outward movement, by the pedals, by providing the pistons with "leather cup" packing $q^2$, rendering them air-tight against pressure on their inner sides only. This would avoid the causing of a vacuum behind a piston because of its outward movement by the pedal, while the valve, $o$, closes the inlet port of the cylinder, for such movement of the piston would have a tendency to press said packing away from the cylinder walls and thus create an air passage.

The tubular casing, 13, is fastened to the gear-shift lever, $i$, in order that the movement of the latter in shifting the gears, and the operation of the clutch, and the brake, may be accomplished from one point, instead of several independent points. When my device is used, the hand that rotates the knob 14 to operate the valve, $o$, also moves the gear-shift lever to control the speed and direction of travel. I further provide means for locking the gear-shift lever against movement in the H-plate, in order to prevent injury to the gears, by attempting to vary the speed while the clutch is still in engagement.

A series of notches 18, running laterally across the face of the H-plate (see Fig. 4) provide different seats for the lower end of the locking rod 19. It may be found more convenient to use a series of parallel pins or lugs, instead of cutting the notches 18. In this case, the grooves between said pins or lugs would perform the same function as the notches. Said rod 19 is movably held by plates 20 and 21, located, respectively, at the upper end of the tubular casing 13, and at the lower end of the valve chamber $n$. The rod 19 is made in two pieces connected by a turn-buckle 22. The knob 14 is made with an integral disk 24, having a recess 25, the ends of which are inclined as shown in Fig. 7. A small notch 25', located in said disk, forms a seat for the upper end of the rod 19. The seating of said rod in this notch indicates to the operator, when the valve is properly set in predetermined initial position, to actuate the clutch operating mechanism. When the clutch is in action the knob 14 and its disk 24 will be positioned to cause the latter to depress the rod 19 into a notch 18 on the H-plate, and thus lock the gear-shift lever against forward or backward movement. When the knob 14 is rotated to set the valve, $o$, to actuate the piston in the clutch cylinder $q$—thus disengaging the clutch—the recess 25 will be positioned over the upper end of the rod 19, and the spring 23 will act to lift the rod out of engagement with the H-plate, upon which the gear-shift lever may be positioned as desired. The spring 23, by virtue of constantly exerting a lifting action against the knob 14, and through the latter on the valve rod 12, also serves to hold the valve, $o$, to its seat. When it is not desired to use the locking feature, the latter may be rendered inoperative by turning up the turn-buckle, thus shortening the rod 19, and rendering it inoperative.

A lever handle 26 is provided for facilitating the turning of the knob 14. The handle is hinged so that it may be lifted up when desired. A pin 27, having a lug 28 on its lower end, bears in the knob 14, as shown in Fig. 2. The shank of the pin 27 is square and the pin has vertical movement in a guide-way (not shown) provided in the knob 14. The movement of the pin is limited in one direction by its head $27^a$ and in the other by the lug 28.

As mentioned, a partial rotating of the valve, $o$, in one direction causes the disengagement of the clutch, and a further rotation in the same direction causes the application of the brake. To guide the driver in these movements of the knob 14, the plate 20, over which the knob 14 rotates, is formed with stops 29 and 30 (see Fig. 8). Thus when the pin 27 is placed in contact with the stop 29, valve, $o$, is in its neutral position; when midway between stops 29, 30, the clutch cylinder is connected; and when in contact with the stop 30 both the clutch and the brake cylinders are connected with the tank $b$. When the brake cylinder is to be independently connected, the pin 27 is lifted—by the operator's finger pressing upwardly against the lug 28—over the stop 30 and the valve is then rotated to the desired position, namely, until the pin 27 is on the other side of the stop 30; and the valve is restored to neutral position in the same way.

In Fig. 9 is shown a modified form of controller valve $o'$, which may be used instead of the conical type illustrated in the preceding figures. Said valve consists of a flat disk 88, having a projecting stem 89. A segmental circular slot 90 is cut entirely through the disk, and forms a passageway for the compressed fluid from the port, 11, connecting with the storage tank to ports 94, 95, connecting with the clutch and brake cylinders respectively. On the upper surface of this disk is a segmental groove 91 and a radial groove 91'. A groove 92, in the periphery of the projecting stem 89, connects the groove 91' with the atmosphere, so that when the groove 91 is in communication with the ports connecting with the clutch and brake cylinders, an exhaust passage will be created. The housing $n'$ of this valve is formed with a port 93, through which the fluid under pressure is admitted from the storage tank, a port 94 connecting with the clutch cylinder and a port 95 connecting with the brake cylinder. A handle 96 on the stem 89 is a means by which the valve may be rotated so as to position same as desired. In this way fluid may be admitted to either the clutch or the brake cylinder or to both. In like manner, either or both cylinders may be exhausted through the grooves 91, 92.

Another form of construction is shown in Fig. 12. In this case, the valve is stationary and is operated from the gear-shift lever. The operating valve, $o$, inclosed in the housing $n$ is of an identical construction with the valve shown in Fig. 3, the ports being connected to the pedal cylinders and storage tank by the connections $y^2$ $l^2$, respectively. These connections are made so as to have a very slight yielding movement. Said valve mechanism is firmly mounted on one of the frame members $k'$ of the vehicle, and a flexible transmission member 31, operated from the upper part of the gear-shift lever, furnishes means through which the valve may be given a rotary motion. The H-plate $k$ is similar to the plate shown in Fig. 4, and a gear-shift lever $i'$ connects with the transmission box in the usual manner, partially shown at $j'$. The upper portion of this gear-shift lever comprises a tubular casing 13', slightly offset from the lower portion of said lever so as to provide a more convenient bearing for the valve controlling devices. A disk 20, containing the lugs 29, 30, acts as one guide for the locking rod 19, the other guide for the same being a lug 21' swung from the gear-shift lever $i'$. The locking rod is provided with the turn-buckle 22 and spring 23 for the same purposes as previously described. The turning knob 14, with the attached disk 24, and handle 26, are mounted on the rod 12'; the latter being rotatably mounted in the tubular casing 13'. A conduit 32, connecting said tubular casing 13' and the valve housing $n$, acts as a bearing for some convenient form of flexible shafting, not shown herein, but which connects the valve rod 12' to the valve $o$. In this way, a rotary motion of the turning knob 14 will be transmitted to the valve $o$, giving the latter the same angular movement.

Another modified form of construction is shown in Fig. 13. In this form, the valve is an integral part of the gear-shift lever. The form of construction used in this case is substantially the same as that shown in Fig. 1, the differences being as follows: The regular form of gear-shift lever as illustrated by $i$ in Fig. 1 has been eliminated entirely in the latter construction and an arm $i^2$ rigidly connecting the valve housing, $n$, to the transmission box connections, $j'$, enables the valve operating devices to be used functionally the same as the ordinary form of gear-shift lever. The H plate $k$ is of the form shown in Fig. 4, and because of the fact that the valve operating devices will be located slightly farther from the side of the vehicle body than shown in Fig. 1, and it being necessary that the lower portion of the locking rod retain its same relative position so as to engage with the notches 18, I have provided a locking rod 19' which is curved so as to bring about the desired result. The other parts of my device are all as previously described.

In certain standard makes of automobiles, the brake and clutch mechanisms are controlled by the operation of one pedal only. The means by which my pneumatic control system is capable of being operated in connection with this type of machine are shown in Figs. 14 and 15. A compound pneumatic cylinder, 33, consists of two component cylinders 34, 35, which are equivalent to the clutch and brake cylinders respectively. The cylinder 34 contains a port 34', which connects with the valve, $o$, in the same manner as the clutch cylinder described in the preceding cases. A piston, 36, having a rod, $36^2$, of rectangular cross-section, connects with the operating pedal (not shown herein) in the same manner as shown in Fig. 1. A notch 36' in the piston rod serves as one member of a locking device, so that when the piston has moved forward a distance sufficient to operate the clutch mechanism, it will be automatically locked from further movement, and will not operate the brake mechanism until the locking means have been released. The backward movement of this piston will, however, not be effected by this locking arrangement. In Fig. 14 the devices are shown in the positions assumed by them when the clutch mechanism has been operated, but the piston is locked from the further movement which would operate the brake mechanism.

The automatic locking devices are arranged as follows: The cylinder, 35, located laterally with respect to the cylinder 34, has a port 35' which connects with the valve, $o$, in the same manner as the brake cylinder shown in the preceding cases. A piston 37 carries on its outer end a yoke 37' having a rectangular opening which is somewhat larger than the cross-section of the piston rod $36^2$. This yoke acts as a bearing for the piston rod, and when depressed allows a free sliding movement of the piston rod through the rectangular opening of the former; but when the yoke is raised to engage in the notch 36' the piston 36 will be locked from a further forward movement. The guideways 38, located on the head of the cylinder 34, prevent any lateral movement of yoke 37'. A spring 39 normally holds the piston, 37, toward the port end of this cylinder, as shown in Fig. 14. Let us assume that air has been admitted to the cylinder 34, through the port 34'. The piston 36 will move to the position shown in Fig. 14, at which point the action of the spring 39 will raise the piston 37, thereby locking the piston 36 from any further forward movement. The movement thus far, however, has been sufficient to operate the clutch mechanism. Air admitted to the cylinder, 35, through the port 35' will cause the piston to be lowered, thereby disengaging the locking member 37' from the notch 36' and allowing the piston 36 to move farther forward so as to operate the brake mechanism. When the valve, o, has been operated so as to relieve the pressure in the cylinders, the piston will be returned to its inoperative position by means of the regular form of pedal spring, as shown in Fig. 1.

In Figs. 16, 17, 18, 19 and 20 is illustrated another modified form of construction in which the valve is operated by the gear-shift lever and from another point or points remote. In this application of my invention, I have shown means by which the clutch will be automatically disengaged and re-engaged by an operation of the gear control lever and the control of the valve for admitting air to the pneumatic cylinders accomplished from some other point or points. To this end I use a special form of valve 40, as shown in Figs. 18, 19, 20. This valve contains three ports, 41, 42, 43. The port 41 admits air from the storage tank through the pipe 41', the port 42 connects with the clutch cylinder through the pipe 42', and the port 43 is connected with the brake cylinder through the pipe 43'. A pair of ball check valves, 44, 45, normally close the ports 42, 43, respectively, but when either or both of these balls are raised from their seats the respective ports will be open and air will be admitted to the corresponding cylinders, thereby actuating the clutch or brake mechanisms. The plugs 46 merely close the openings through which the balls, 44, 45 are dropped into their seats. Directly beneath the check-valves are counter-bored holes which act as bearings for the movable hollow plungers 47 and 48. In order to make the bearings air-tight, I provide the packing 49, held in place by packing glands 50. The hollow plungers, 47, 48 are made tubular, and of such length that when they are in their normal or down position the openings through them will not be closed by the balls, 44, 45, but will allow an exhaust from the clutch and brake cylinders to the atmosphere. When, however, they are moved upward, their upper ends will contact with the balls and raise the latter from their seat. The balls will then be re-seated on the ends of these plungers, thereby closing the exhaust ports through said plungers. The upper ends of the plungers are of smaller diameter than the seat of the check-valves, as shown at 47' and 48', so therefore when the plungers have been raised, and the check valves opened, free passages will have been formed between the intake port 41 and the ports 42, 43. It will therefore be seen that by raising the plunger 47, the clutch mechanism will be operated, by raising the plunger 48 the brake mechanism will be operated, and by raising both plungers together the two mechanisms will be actuated synchronously.

A bell-crank 57 is pintled at 58 between the ears 59 on the base of the valve 40. See Figs. 17 and 20. The arm 60 of this crank projects beneath the base of the valve and forms a bearing for the lower end of the plunger 47. The spring 50' depressing said plunger will normally hold said lever in the position shown in Fig. 17, the arm 61 of said crank being stopped by the lug 62 of the valve 40. In the devices illustrated under this case, I have provided means by which the plunger 47 will be raised by a movement of the gear-shift lever i, means by which the plungers 47, 48 will be raised separately or together by the operation of a foot pedal, and means by which both plungers may be raised from a distant point of control, as, for instance, from the tonneau of a car. The means for accomplishing the first end are shown in Figs. 16 and 17. A box 51, mounted on one of the frame-members of the chassis, acts as a bearing for a cam-bar 52, the latter being longitudinally movable. A double-armed lever 53 is rotatably journaled on the side of the box 51, one of the arms 54 being held against the surface of the cam by a spring, not shown herein, the other arm 55 being connected to the crank arm 61 by the wire 63, the latter being run over suitable pulleys, as 63'. It will therefore be seen that a movement of the cam-bar in either direction will actuate the lever 53. The consequent rocking of the arm 55 will exert a pull on the wire 63, so as to rotate the bell-crank 57, thereby raising the plunger 47 and consequently causing the clutch to be disengaged. The action of the spring 50', which is compressed by the elevating of plunger 47, will tend to hold the bell-crank 57 in the position shown in Fig. 18, thereby exerting enough tension in the wire 63 to cause the lever 53 to return to the position shown in Fig. 17, when the cam bar 52 is moved away from its contact with lever arm 54. One end of the cam-bar 52 contains a rectangular slot 56, in which the gear-shift lever i bears. The slot 56 is disposed laterally with respect to the backward or forward movement of said lever, so that a lateral movement of the lever will not affect the valve 40, whereas a backward or forward movement will move the cam bar 52, thereby actuating the lever-arm 54 and operating said valve in the manner previously described. It will therefore be seen that the gear-shift lever will never be actuated without coincidentally disengaging the clutch. The lower part of the valve 40 is provided with a lateral extension 64, which serves as a bearing for a rotatable thimble 65. A vertical slot in this thimble allows a bell-crank 66, which is mounted therein, to have a limited movement on its pintle 67. A spring 68 holds said bell-crank normally in the position shown in Fig. 16. The upright arm 69 of this bell-crank is formed as a foot pedal, while the lower arm 70 bears on its end a lateral cross-piece 71. This lateral cross-piece is made with a recessed end 71' which normally lies under the plunger 48, as shown in Figs. 18 and 20. Lugs 72, 73 on the lower surface of the valve extension 64 permit only a limited lateral movement of the bell-crank, the limiting positions of such movement being shown in Fig. 20. A spring 73' normally holds the arm 70 in the position shown in the full lines of this figure. The cross-piece 71 is of such length that when the bell-crank is in its normal position said cross-piece will lie beneath both plungers 47, 48. See Fig. 20. A pressure applied to the center point of the foot pedal 69 will elevate the arm 70 a certain height, thereby raising the plunger 47 and causing the clutch mechanisms to be operated. A continued pressure will cause the arm 70 to be raised slightly higher, thereby elevating the plunger 48 and consequently causing both the clutch and brake mechanisms to be operated. However, if a pressure is applied to the end of the foot-pedal, as indicated by the arrow in Fig. 19, the bell-crank 66 and thimble 65 will be rotated until the crank arm 70 will contact with the lug 73. This movement will cause the cross-piece 71 to swing clear of the plunger 47, so that when continued pressure is applied to the pedal, only the plunger 48 will be raised, thereby causing the brake mechanism to be actuated.

The means by which the clutch and brake mechanisms are actuated from a distant point of control are shown in Fig. 16.

A wire 74 running over the pulleys 75 is attached at one end to the shank of the foot pedal, the other end extending back to some point from which the control is desired. A pull on said wire will rock the bell-crank 66, thereby operating said mechanisms, as above described.

In Figs. 21, 22 and 23 is illustrated a form of construction to be used when the valve is to be operated from or by the gear control lever and from another point. The devices used in this case are very similar to those described in the preceding case, the main difference being that in this modification the valve is controlled from the gear-shift lever. The gear-shift lever $i^2$ bears in the H-plate $k^2$ and connects with the transmission box in the regular manner. The upper end of this lever is offset from the main shank of said lever and is made tubular in form, as shown at 76 in Figs. 21 and 23. On the exterior periphery of the tube 76 are the two lugs 77, 77', the purpose of which will be shown later. A cap 78, having a stem 79, is rotatably journaled in the tube 76. A diametrical slot 80 in the upper surface of said cap is flanked by a pair of ears 81 between which is pivoted a lever handle 82. The purpose of the slot 80 is to permit a greater movement of the handle 82 than could be otherwise accomplished. Said handle is made with a vertically projecting hook finger 83, so that when the handle is depressed a slight rotary movement of the cap to the left will position the finger under the lug 77, thereby holding the handle in that position. Conversely, when the handle 82 is raised, a slight rotary motion will position the finger over the lug 77' by which it will be retained in that position until released. Connected with the handle on opposite sides of the fulcrum are the two wires, 84, 85, and it is by the raising of these wires that the valve is operated. Guides 86 on the gear-shift lever maintain said wires in a convenient position, and pulleys 87 provide convenient bearings for said wires. The bell-crank 66' is identical with the crank shown in Fig. 16, both in construction and operation. The wires 84, 85 are connected with the pedal 69' as shown in Fig. 22. The cam-bar 52 and means of operation are the same as previously described.

The method of operation of these devices is as follows: When the gear-shift lever is moved either forward or backward, the clutch mechanism will be actuated in the same manner as described in the preceding case. When the handle 82 is depressed, the wire 84 will be raised, thereby exerting a straight pull on the bell-crank 66' and consequently operating both the clutch and brake mechanisms. When said handle is raised, a pull on the wire 85 will be exerted, thereby causing the bell-crank to swivel around to the position shown in the dotted lines of Fig. 20. A further pull will rock the crank on its pintle, thereby causing the brake mechanism to be actuated.

In Fig. 24 I have illustrated a convenient form of construction when the agent used is electrical energy instead of compressed air. The foot-pedals, $d$, $g$, controlling the brake and clutch mechanisms, respectively, are shown in their usual form, as connected to the brake shaft $d'$ and clutch operating sleeve $g'$. The solenoids, 88, 89, located in front of these pedals have their movable armatures 88' and 89' pivotally connected to said pedals. A movable switch 97 is incorporated in the gear-shift lever $i$, so that a rotary movement of said switch will make and break certain circuits through the solenoids 88, 89. A switch, 100, located at some other point may also be operated so as to have the same effect as the operation of the switch 97. Resistances are provided so that the solenoids will be energized gradually, instead of receiving the full strength of the circuit immediately. In Fig. 24 the parts are positioned so as to actuate the clutch mechanism. The circuit made through the switch 97, wire 93, solenoid 89, wire 92, wire 90, battery 94 and wire 95 energizes said solenoid and attracts the armature 89, thereby throwing the clutch pedal $g$ forward to the position shown in dotted lines, thereby disengaging the clutch. When the circuit has been broken, the pedal $g$ will resume its normal position by action of regular pedal spring not shown herein. When the switch 97 is moved so that it will contact with the wire 91, having first passed the resistances 98, 99, the circuit through the switch 97, wire 91, solenoid 88, wire 90, battery 94, wire 95, will be closed, thereby energizing the solenoid 88 and causing the armature 88' to be moved so as to actuate the brake mechanism. It will be noted that the switch 97 may be moved so as to energize either or both solenoids at the same time. When the switch 100 is rotated the solenoids 88, 89 may be energized in the same manner as previously described.

When a combination of pneumatic electric devices is to be used, the construction shown in Figs. 25 and 26 may be conveniently used. In this case the pneumatic cylinders $p$ and $q$ are of identical construction with the cylinders shown in Figs. 1 and 6. The pump, $a$, connects with the storage tank $b$ through the pipe $c$. A pipe $y^5$, running from the storage tank, $b$, connects with the two branch pipes $y^3$, $y^4$, leading to the brake and clutch cylinders respectively. Located in these branch pipes are the valves 104, 105, which normally prevent the compressed fluid from passing into said cylinders. The details of valve 104 are shown in Fig. 26. A conical plug 117 is an integral part of the movable armature 106' of the solenoid 106, and is normally seated in the valve chamber through the action of the spring 110'. A groove 118 in the plug and port 115 in the valve casing form an exhaust from the cylinder when said valve is closed. When, however, the valve is open the port 115 will be closed, as shown in Fig. 26, thereby preventing air admitted from the storage tank from exhausting through this port.

The movable switch 111 is incorporated in the gear-shift lever $i$. By moving said switch so as to contact with the wire 107, the circuit through the solenoid 113 will be closed as follows: switch 111, wire 107, solenoid 113, wire 108, battery 94, wire 112. This energizes the solenoid 113, thereby causing the armature 113 to be moved and opening the valve 105. The consequent admission of air to the clutch cylinder will actuate the clutch mechanism in the manner previously described. In the same way the valve 104 may be opened by moving the switch 111, so as to contact with the wire 109. This movement closes the following circuit: switch 111, wire 109, solenoid 106, wire 110, wire 108, battery 94, wire 112, thereby energizing the solenoid 106 and causing the armature 106' to be moved to the position shown in Fig. 26. A switch 100' located at some other point may also be moved so as to make and break the circuits through the solenoids 106, 113. It is to be noted that in this case also the switch mechanism is so arranged that either the clutch or brake mechanisms, or both together, may be actuated at the will of the operator.

In my claims the expression "manually operated member" is to be understood as designating the manually operated means provided for changing the speed of the gear drive, (for example, the gear-shift lever) operated by hand or foot, whether operating directly or indirectly, for actually changing the speed or merely placing the speed changing means in a state to be later actuated by other means. The variable speed gearing includes all forms of change speed gearing, and thus friction transmission. The term "controller" is used to designate a valve or other devices or means whereby the automatic means actuating the clutch and the brake mechanism are thrown into action. The expression "associated with" as used in connection with the manually operated member, that is, the gear-shift lever or its equivalent, is to be understood as meaning both embodied in or attached or otherwise related or linked in action with said member. The expression "manual speed controlling means" as specified in claims 9 and 10 is to be understood as referring both to the means for transmitting power as well as to the means for applying a brake to check the speed.

I claim:

1. In a self propelling vehicle, variable speed gearing, a manually operated member controlling the latter, clutch mechanism, auxiliary means for operating the latter, and a controller for said auxiliary means, such controller being associated with said manually operated member of the variable speed gearing.

2. In a self propelling vehicle, variable speed gearing, a manually operated member controlling the latter, clutch mechanism, auxiliary means for disengaging the clutch, and a controller for said auxiliary means, such controller being associated with said manually operated member of the variable speed gearing.

3. In a self propelling vehicle, variable speed gearing, a manually operated member controlling the latter, clutch and brake mechanisms, auxiliary means for operating such clutch and brake mechanisms, and a controller for said auxiliary means, such controller being associated with said manually operated member of the variable speed gearing.

4. In a self propelling vehicle, variable speed gearing, a manually operated member controlling the latter, clutch mechanism, auxiliary means for operating the clutch, such means including a fluid actuated piston and cylinder, the piston being connected with the clutch mechanism; and a controller for said auxiliary means, such controller being associated with said manually operated member.

5. In a self propelling vehicle, variable speed gearing, a manually operated member controlling the latter, clutch mechanism, auxiliary means for operating the clutch, such means including a fluid actuated piston and cylinder, the piston being connected with the clutch mechanism; and a controller for said auxiliary means, such controller being associated with said manually operated member, the operating parts having a flexible connection permitting the relative movement of the controller.

6. In a self propelling vehicle variable speed gearing, a manually operated member controlling such gearing, clutch mechanism, auxiliary means for operating the latter including a fluid actuated piston and cylinder, the piston being connected with the clutch mechanism; means for limiting the movement of the piston relatively to the action required of the clutch; and a controller for said fluid actuated means, such controller being associated with said manually operated member.

7. In a self propelling vehicle, variable speed gearing, a manually operated member controlling the latter, clutch mechanism, auxiliary means for operating the clutch, a controller for said auxiliary means, such controller being associated with said manually operated member of the variable speed gearing; and means operatively connected with said controller whereby said manually operated member is locked in place until the positioning of the controller to actuate the auxiliary means to disengage the clutch.

8. In a self propelling vehicle, variable speed gearing, a manually operated member controlling the latter, clutch mechanism, auxiliary means for operating the clutch, a controller for said auxiliary means, such controller being associated with said manually operated member of the variable speed gearing; a notched guide-plate for guiding said manually operated member, and automatic means on the latter operatively connected with the controller, whereby the manually operated member is locked in place when positioned otherwise than for actuating the clutch-operating mechanism to disengage the clutch.

9. In power transmitting mechanism, the combination of variable speed gearing, a manually operated member controlling the latter; manual speed controlling means; auxiliary means for actuating said manual speed controlling means; and a controller for said auxiliary means; said controller being associated with said manually operated member of the variable speed gearing.

10. In power transmitting mechanism, the combination of variable speed gearing; manual speed controlling means; auxiliary means for actuating said speed controlling means; and a controller for said auxiliary means.

11. In a device of the class described, the combination of variable speed gearing, a manually operated member controlling such gearing and clutch mechanism including a pedal, means auxiliary to said pedal and operable by a force other than manual for operating said clutch mechanism, and a controller for said auxiliary means, means for affixing the auxiliary means on a vehicle and connecting them with said pedal of said clutch mechanism, and further means for affixing said controller on said manually operated member of said variable speed gearing.

12. In a device of the class described, the combination of variable speed gearing, a manually operated member controlling such gearing, and clutch mechanism including a pedal, fluid actuated means auxiliary to said pedal for operating said clutch mechanism, and a controller for said auxiliary means, means for affixing the auxiliary means on the vehicle and connecting them with said pedal of said clutch mechanism, and further means for affixing said controller on said manually operated member of said variable speed gearing.

13. In a device of the class described, the combination of variable speed gearing, a manually operated member controlling such gearing, and clutch and brake mechanisms, each including a pedal, means auxiliary to said pedals operable by a force other than manual for operating said clutch and brake mechanisms, and a controller for said auxiliary means, means for affixing the auxiliary means on the vehicle and connecting them with said pedals of said clutch and brake mechanisms, and further means for affixing said controller on said manually operated member of variable speed gearing.

14. In a device of the class described, the combination of variable speed gearing, a manually operated member controlling such gearing, and clutch and brake mechanism each including a pedal, fluid actuated means auxiliary to said pedals for operating said clutch and brake mechanisms, and a controller for said auxiliary means, means for affixing the auxiliary means on the vehicle and connecting them with said pedals of said clutch and brake mechanisms, and further means for affixing said controller on said manually operated member of said variable speed gearing.

15. In a device of the character described, the combination of variable speed gearing, a manually operated member controlling such gearing, and clutch mechanism, including a pedal, means auxiliary to the pedal and operable by a force other than manual for operating said clutch mechanism, and a controller for said auxiliary means, means for affixing the auxiliary means on a vehicle and connecting them with said pedal of said clutch mechanism, other means for affixing said controller on said manually operated member of said variable speed gearing, and means on said manually operated member and connected with said controller for locking the manually operated member in place when positioned otherwise than for actuating the pedal of the clutch mechanism to release the clutch.

16. In a device of the character described, the combination of variable speed gearing, a manually operated member controlling such gearing and clutch mechanism including a pedal, means auxiliary to the pedal operable by a force other than manual for operating said clutch mechanism, and a controller for said auxiliary means, means for affixing the auxiliary means on the vehicle and connecting them with said pedal of said clutch mechanism, other means for affixing said controller on said manually operated member of said variable speed gearing, means for guiding the movement of said manually operated member in the act of adjusting the variable speed gearing, and means on said manually operated member and connected with said controller for locking the manually operated member in place when positioned otherwise than for actuating the pedal of the clutch mechanism to release the clutch.

17. A power transmitting mechanism comprising variable speed gearing, a manually operated member controlling the latter, a clutch element, means for operating the clutch; and a controller for said means, said controller being associated with said manually operated member of the variable speed gearing.

18. A power transmitting mechanism comprising variable speed gearing, a manually operated member controlling the latter, a clutch element, brake mechanism, means for operating the clutch and the brake; and a controller for said means, said controller being associated with the manually operated member of the variable speed gearing.

19. A power transmitting mechanism comprising variable speed gearing, a manually operated member controlling the latter; a clutch, means for operating the clutch; a controller for said means, said controller being associated with the manually operated member of the variable speed gearing; and a lock connected with said controller whereby the manually operated member is locked in place until the positioning of the controller to effect the disengagement of the clutch.

20. A power transmitting mechanism comprising variable speed gearing, a manually operated member controlling the latter; a clutch, means for operating the clutch; a controller for said means, said controller being associated with the manually operated member of the variable speed gearing; and a locking means connected with said controller whereby the manually operated member is locked in place until the positioning of the controller to effect the disengagement of the clutch, said locking means also adapted to prevent the reëngagement of the clutch until the variable speed gearing has been properly reset.

21. A power transmitting mechanism comprising variable speed gearing, a manually operated member controlling the latter; a clutch, means for operating the clutch; a controller for said means, said controller being associated with the manually operated member of the variable speed gearing; and a locking means connected with said controller, whereby the manually operated member is locked in place until the positioning of the controller to effect the disengagement of the clutch, said means for locking the manually operated member in place adapted for being adjusted into inactive state.

22. A power transmitting mechanism comprising variable speed gearing, a manually operated member controlling the latter; a clutch; brake mechanism; means for operating the clutch and the brake; a controller for said means, said controller being associated with the manually operated member of the variable speed gearing; and means for guiding the positioning of the controller with respect to the operation of the clutch and brake mechanism, or either thereof.

23. A power transmitting mechanism comprising variable speed gearing, a manually operated member controlling the latter; a clutch; means for disengaging the clutch; a controller for said means, said controller being associated with the manually operated member of the variable speed gearing; a notched plate for guiding said manually operated member, and locking means on the manually operated member for engaging with said plate, said locking means actuated by the controller, whereby the manually operated member is locked in place when the controller is positioned otherwise than for effecting the disengagement of the clutch.

24. A power transmitting mechanism comprising variable speed gearing, a manually operated member controlling the latter; a clutch; brake mechanism; fluid actuated means for operating the clutch and the brake; and a controlling valve for said fluid actuated means, said controlling valve operable from the manually operated member of the variable speed gearing.

25. A power transmitting mechanism comprising variable speed gearing, a manually operated member controlling the latter; a clutch; brake mechanism; fluid actuated means for disengaging the clutch and applying the brake; a controlling valve for said fluid actuated means, said controlling valve operable from the manually operated member of the variable speed gearing; and a lock connected with the controller whereby the manually operated member is locked in place until the positioning of the controller to effect the disengagement of the clutch.

C. W. MORDEN.

Witnesses:
CECIL LONG,
WM. C. SCHMITT.